United States Patent [19]

Ohmura et al.

[11] 4,454,302
[45] Jun. 12, 1984

[54] POLYESTER RESIN COMPOSITION

[75] Inventors: Yasuhiro Ohmura, Kawasaki; Seiichiro Maruyama; Shigeru Shigemoto, both of Kitakyushu, all of Japan

[73] Assignee: Mitsubishi Chemical Industries Ltd., Tokyo, Japan

[21] Appl. No.: 411,273

[22] Filed: Aug. 25, 1982

[30] Foreign Application Priority Data

Sep. 9, 1981 [JP] Japan .................. 56-142037

[51] Int. Cl.³ .............................. C08L 67/02
[52] U.S. Cl. .................... 525/167; 525/176; 524/409; 524/513
[58] Field of Search ................ 525/176, 167

[56] References Cited

U.S. PATENT DOCUMENTS 4,128,709 12/1978 Vollkommer .................. 526/218

FOREIGN PATENT DOCUMENTS 52-03682 5/1977 Japan .
53-111354 9/1978 Japan .

Primary Examiner—John C. Bleutge
Assistant Examiner—Patricia Short
Attorney, Agent, or Firm—Oblon, Fisher, Spivak, McClelland & Maier

[57] ABSTRACT

A polyester resin composition comprising:

(a) 100 parts by weight of a copolymerized polyester resin
ⓐ with a halogen content of 3 to 15% by weight prepared by copolymerizing terephthalic acid or an ester-forming derivative thereof; an alkylene glycol having 2 to 10 carbon atoms or an ester-forming derivative thereof; and a halogen-containing aromatic diol represented by the general formula:

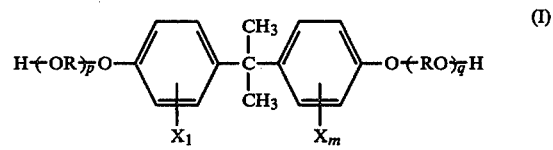

wherein R represents an alkylene of 2 to 4 carbon atoms, X represents a halogen atom, 1 and m each represents an integer of 1 to 4 and p and q each represents an integer of 1 to 10, and (b) 0.1 to 10 parts by weight of an acrylic resin ⓑ with a halogen content of not less than 10% by weight prepared by polymerizing a benzyl acrylate or benzyl methacrylate represented by the general formula:

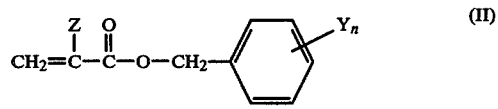

wherein Y represents a halogen atom, n represents, an integer of 1 to 5 and Z represents hydrogen or methyl.

10 Claims, No Drawings

POLYESTER RESIN COMPOSITION

BACKGROUND OF THE INVENTION

1. Field of the Invention

This invention concerns a polyester resin composition. More specifically, it relates to a polyester resin compositon which is flameproofing and excellent in melt-flow property and anti-tracking property.

2. Description of the Prior Art

It has been known that flameproofing polyester resins are obtained, for example, by a method of adding a polymer mainly comprising halogen-containing benzyl acrylate or benzyl methacrylate to a polyester resin (Japanese Patent Laid-Open No. 3682/1977) or a method of blending a halogenated bisphenol-A epoxy resin with a copolymerized halogen-containing polyester resin prepared by copolymerizing terephthalic acid or its ester, an alkylene glycol and a halogen-containing aromatic diol (Japanese Patent Publication No. 44300/1979). However, the resin compositions obtained by the former method are defective in that they have poor melt-flow property and require high injection pressure upon injection molding. They are also defective in that the molding products have insufficient anti-tracking property. The resin compositions obtained by the latter method are disadvantageous in that the melt-flow property deteriorates as the molding step proceeds in the molten state thereby making it difficult to conduct continuous molding for a long period and also have a defect in that the anti-tracking property of the molding products thus obtained is poor.

SUMMARY OF THE INVENTION

Upon earnest study for obtaining a flameproofing polyester resin with no such defects, the inventors have found that a flameproofing polyester resin composition which is excellent in melt-flow property and also shows excellent anti-tracking property when prepared into molding products can be obtained by blending the halogen-containing polyester resin with a polymer prepared by polymerizing the halogen-containing benzyl acrylate or benzyl methacrylate as mentioned above, and accomplished this invention. Accordingly, it is an object of this invention to provide a polyester resin composition of great industrial values and the characteristic feature thereof resides in a polyester resin composition comprising:

(a) 100 parts by weight of a copolymerized polyester resin (a) with a halogen content of 3 to 15% by weight prepared by copolymerizing terephthalic acid or an ester-forming derivative thereof, an alkylene glycol having 2 to 10 carbon atoms or an ester-forming derivative thereof and a halogen-containing aromatic diol represented by the general formula:

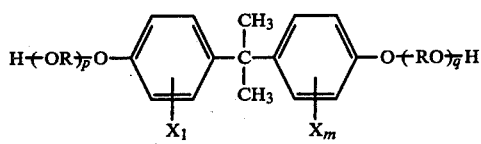

wherein R represents an alkylene of 2 to 4 carbon atoms, X represents a halogen atom, l and m each represents an integer of 1 to 4 and p and q each represents an integer of 1 to 10, and (b) 0.1 to 10 parts by weight of an acrylic resin (b) with a halogen content of not less than 10% by weight prepared by polymeriziing a benzyl acrylate or benzyl methacrylate represented by the general formula:

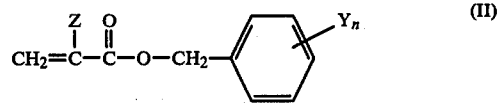

wherein Y represents a halogen atom, n represents an integer of 1 to 5 and Z represents hydrogen or methyl.

DESCRIPTION OF THE PREFERRED EMBODIMENTS

This invention is described more in details.

The copolymerized polyester resin (a) for use in this invention is obtained by copolymerizing terephthalic acid or its ester-forming derivative, an alkylene glycol or its ester-forming derivative and a halogen-containing aromatic diol.

As the ester-forming derivative of terephthalic acid, alkyl esters thereof or the like may be used. In this invention, terephthalic acid and dimethyl terephthalate are particularly preferred. The terephthalic acid or its esters may additionally contain other polybasic acid, for example, phthalic acid, isophthalic acid, naphthalene dicarboxylic acid, adipic acid, sebasic acid or the esters thereof by a small amount up to 30 mol %.

The alkylene glyol used herein includes straight chain glycols of not more than 10 carbon atoms such as 1,4-butanediol, 1,3-propanediol, ethylene glycol and 1,6-hexanediol.

The alkylene glycol may, of course, be substituted with ester-forming derivatives thereof. For instance, instead of ethylene glycol, ethylene oxide which is an ester-forming derivative thereof may be used.

The halogen-containing aromatic diol is represented by the following general formula:

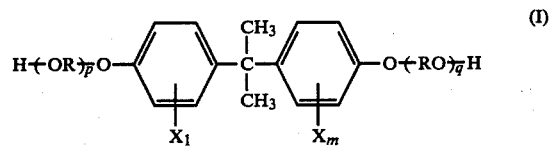

wherein R represents an alkylene group, X represents a halogen atom, l and m each represents an integer of 1 to 4 and p and q each represents an integer of 1 to 10.

The halogen-containing aromatic diol may be prepared by any known process. For instance, it can be obtained by the addition of an appropriate alkylene oxide such as ethylene oxide and propylene oxide to, or by reacting an alkylene halohydrin such as ethylene chlorohydrin with a halogenated bisphenol-A. The composition of the halogen-containing aromatic diol, especially, R, p, q and the like are determined depending on the reaction conditions and the molar ratio for the reactants employed. Particularly preferred are those in which p and q each represents an integer of 1 to 4, R represents

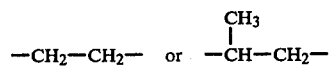

and X represents bromine or chlorine.

They include, specifically;
2,2-bis[4-(2-hydroxyethoxy)-3,5-dibromophenyl]propane,
2,2-bis[4-(2-hydroxyethoxy)-3,5-dichlorophenyl]propane,
2,2-bis[4-(2-hydroxypropoxy)-3,5-dibromophenyl]propane,
2,2-bis[4-(3-hydroxypropoxy)-3,5-dibromophenyl]propane,
2,2-bis[4-(2-hydroxypropoxy)-3,5-dichlorophenyl]propane,
2,2-bis[4-(3-hydroxypropoxy)-3,5-dichlorophenyl]propane,
2,2-bis[4-(2-hydroxyethoxy)-3-bromophenyl]propane,
2,2-bis[4-(2-hydroxyethoxy)-2,3,5,6-tetrabromophenyl]propane and the like.

Known methods can be applied for producing the copolymerized polyester by copolymerizing these three ingredients. For instance, the copolymerized polyester may be prepared by charging the above mentioned three ingredients upon ester exchange reaction or esterification reaction, followed by subsequent polycondensation, or by previously reacting terephthalic acid or its ester with an alkylene glycol to form a bis(β-hydroxyalkyl)terephthalate or lower-degree polymer thereof and, thereafter, adding the halogen-containing aromatic diol represented by the above general formula (I) to carry out polycondensation reaction. The amounts of the halogen-containing aromatic diol is selected from such a range that the copolymerized polyester thus obtained has a halogen content of 3 to 15% by weight and, preferably, 5 to 10% by weight.

The acrylic resin (b) for use in this invention is obtained from a halogen-containing benzyl acrylate or benzyl methacrylate represented by the above general formula (II) by polymerizing each one of them individually, copolymerizing two or more of them or copolymerizing with other vinylic monomer.

The halogen-containing benzyl acrylate includes, for example, pentabromobenzyl acrylate, tetrabromobenzyl acrylate, tribromobenzyl acrylate, pentachlorobenzyl acrylate, tetrachlorobenzyl acrylate, trichlorobenzyl acrylate or a mixture thereof. The halogen-containing benzyl methacrylate includes, for example, those methacrylates corresponding to the acrylates mentioned above.

The vinylic monomer for use in copolymerization with the halogen-containing benzyl acrylate or benzyl methacrylate includes, for example, acrylic acid, acrylic acid esters such as methyl acrylate, ethyl acrylate, butyl acrylate and benzyl acrylate, methacrylic acid, methacylic acid esters such as methyl methacrylate, ethyl methacrylate, butyl methacrylate and benzyl methacrylate, styrene acrylonitrile, unsaturated carboxylic acids such as fumaric acid and maleic acid or an anhydrides thereof, vinyl acetate or vinyl chloride. They can be usually used in an amount of not more than one mole, preferably not more than 0.5 mole per mole of the halogen-containing benzyl acrylate or benzyl methacrylate.

Further, xylylene diacrylate, xylylene dimethacrylate, tetrabromoxylylene diacrylate, tetrabromoxylylene dimethacrylate, butadiene, isoprene, divinyl benzene or the like can be used as the crosslinking vinylic monomer. They can be used usually in an amount of not more than 0.5 mole per mole of the halogen-containing benzyl acrylate or benzyl methacrylate.

It is required that the acrylic resin (b) for use in this invention have a halogen content of not less than 10% by weight, preferably not less than 30% by weight and, more preferably in the range of 50 to 72% by weight. If the halogen content is too low, a great amount of the acrylic resin (b) has to be blended with the copolymerized polyester (a) in order to obtain a sufficient flameproofing effect. The amount of the acrylic resin (b) to be blended with the copolymerized polyester resin (a) is in the range of 0.1 to 10 parts by weight, preferably 0.5 to 5 parts by weight based on 100 parts by weight of the copolymerized polyester resin (a). It is preferred that the total halogen content in the polyester resin composition after the blending is in the range of 3 to 15 parts by weight, preferably 5 to 10 parts by weight based on 100 parts by weight of the composition.

If the blending amount of the acrylic resin (b) is too low and thus the total amount of the halogen is insufficient, satisfactory flameproofing effect can not be obtained. On the other hand, an excessive blending amount is also undesirable since this will impair the mechanical properties of the copolymerized polyester resin and lowers the melt-flow property and the anti-tracking property as well.

The polyester resin composition according to this invention may further include, depending on the purposes, additives: flameproofing auxiliary agents such as antimony oxide and phosphor compound, reinforcing agents such as glass fibers, carbon fibers and asbestos, fillers such as silica, alumina, silica-alumina, silica-magnesia, calcium silicate, calcium carbonate, glass beads and glass flakes, lubricants such as higher fatty acid esters and paraffin waxes, as well as other stabilizers, antistatic agents, antioxidants, UV absorbers, dyes, pigments or the like.

The polyester resin composition according to this invention may be prepared by well known methods, for example, by blending the pellet of the copolymerized polyester resin (a) with the powder or pellet of the acrylic resin (b), melt-extruding the blending products as mentioned above into pellets using an extruder or the like, or preparing a master batch and mixing the same with the pellet of the copolymerized polyester resin (a).

The polyester resin composition thus obtained is flameproofing and excellent in the melt-flow property and the anti-tracking property and can be processed to various three-dimensional molding products, vessels, shaped molding products such as film, sheet, tube or the like by the well known molding means such as injection molding, extrusion molding and compression molding.

These molding products are desirable as electric or electronic parts, vehicle parts or other industrial materials.

Having generally described the invention, a more complete understanding can be obtained by reference to certain specific examples, which are included for purposes of illustration only and are not intended to be limiting unless otherwise specified.

In the following examples "parts" and "%" represent "parts by weight" and "% by weight", respectively.

The physical properties of the resin composition are measured according to the following methods.

Combustion Property

Vertical combustion test according to UL-94 standards specified by Under Writer's Laboratories Inc.

Melt-flow Property

Continuous molding was conducted using a 3.5 ounce injection molding machine and a molding die with No. 1 dumbbel piece specified in ASTM D-638 at a resin temperature of 265° C. and a die temperature of 80° C. for injection period of 10 sec. and cooling period of 300 sec, and the melt-flow property was determined by the injection pressure at third shot and 15th shot.

Anti-tracking Property

According to ASTM D-3638 (1977)

Preparation example of copolymerized polyester resin

Into a reactor equipped with a stirrer, a fractionating column and a methanol distilling condenser, were charged 100 parts of dimethyl terephthalate, 65 parts of 1,4-butanediol, 15 parts of 2,2-bis[4-(2-hydroxyethoxy)-3,5-dibromophenyl]propane and 2 parts of 1,4-butanediol solution containing 0.6% tetrabutoxy titanium as a catalyst. The temperature was increased up to 210° C. while distilling off methanol. Ester exchange reaction was carried out at the same temperature for 2 hours to distill out 32.1 parts of methanol. Then, 1.3 parts of 1,4-butanediol solution containing 0.6% tetrabutoxy titanium and 1.2 parts of 1,4-butanediol slurry containing 5% Irganox 1010 (manufactured by Ciba-Geigy AG) were added and polycondensation reaction was carried out while gradually heating to 245° C. and reducing the pressure from the normal pressure to a high vacuum of 0.3 mmHg. After 7 hours of the polycondensation, a copolymerized polyester with bromine content of 6% and intrinsic viscosity of 0.83 was obtained.

Preparation example of acrylic resin 2 parts of pentabromobenzyl acrylate were dissolved into 10 parts of propylene glycol at 80° C., 0.02 parts of benzoyl peroxide were added under nitrogen seal and stirred for 2 hours. Then after adding further 0.02 parts of benzoyl peroxide and stirring them at 90° C. for 3 hours, they were stirred at 110° C. for 4 hours and at 120° C. for 1 hour to carry out polymerization reaction.

The reaction mixture was filtered while hot to recover the powderous polypentabromobenzyl acrylate formed, which was washed with propylene glycol, further with water sufficiently and dried at 120° C.

The product had a melting point of 105° to 110° C. and bromine content of 70.8%.

EXAMPLE 1 AND COMPARATIVE EXAMPLES 1-3

To 100 parts of the copolymerized polyester resin prepared in the preparation example described above, were mixed 1.5 parts of the acrylic resin prepared by the preparation example for the acrylic resin as mentioned above and 5.3 parts of antimony trioxide, and they were melt-extruded at 250° C. into pellets using a 40 mm$\phi$ extruder.

The pellets were subjected to molding using a 3.5 ounce injection molding machine (Model TS-100, manufactured by Nissei Jushi Kogyo K.K.) to form a combustion test piece and a test piece specified according to ASTM, at a resin temperature of 260° C. and a die temperature of 80° C. for an injection period of 10 sec and a cooling period of 20 sec.

On the other hand, melt-flow property was measured according to the method described above.

The combustion property, the anti-tracking property and the melt-flow property of the molding products thus obtained are shown in the following Table 1.

For the comparison, a resin composition excluding acrylic resin, a resin composition comprising 100 parts by weight of the same copolymerized polyester resin as used in Example 1 blended with 2.2 parts of a brominated bisphenol-A epoxy resin represented by the formula:

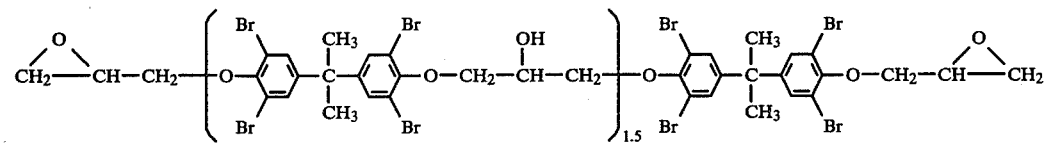

and a resin composition comprising 100 parts by weight of polybutylene terephthalate resin (Novadur 5020, manufactured by Mitsubishi Chemical Industries Ltd., intrinsic viscosity of 1.2) blended with 11 parts of the same acrylic resin as used in Example 1 were tested in the same way. The results are shown together in Table 1.

TABLE 1

| | Blending Composition | | | | | Melt-flow property (kg/cm²) | | |
|---|---|---|---|---|---|---|---|---|
| | Polyester | | Halogen-containing resin | | | Combustion | | Anti-tracking |
| | Copolymerized polyester resin (part) | Polybutylene terephthalate (part) | Acrylic resin (part) | Brominated bisphenol-A epoxy resin (part) | Antimony trioxide (part) | property (1/32") | Third shot | 15th shot | (V) |
| Example 1 | 100 | 0 | 1.5 | 0 | 5 | V-0 | 300 | 300 | 500 |
| Comparative Example 1 | 100 | 0 | 0 | 0 | 5 | V-2 | 280 | 280 | 300 |
| Comparative Example 2 | 100 | 0 | 0 | 2.2 | 5 | V-0 | 300 | 500 | 270 |
| Comparative Example 3 | 0 | 100 | 11.0 | 0 | 5 | V-0 | 380 | 380 | 300 |

EXAMPLE 2 AND COMPARATIVE EXAMPLE 4-6

The same copolymerized polyester resin, acrylic resin and antimony trioxide as used in Example 1 and glass fibers (Chopped strand, manufactured by Asahi Fiber Glass K.K.) were blended each in the amount as shown in the following Table 2 and molded in the same manner as in Example 1.

The results are shown in the following Table 2.

For the comparison, a resin compositions comprising the copolymerized polyester resin as mentioned above blended with the same brominated bisphenol-A epoxy resin as used in Comparative Example 2 and a resin composition comprising a polybutylene terephthalate with intrinsic viscosity of 0.85 (Novadur 5008, manufactured by Mitsubishi Chemical Industries Ltd.) and the acrylic resin were tested.

The results are also shown together in Table 2.

TABLE 2

| | Blending Composition | | | | | | Melt-flow property (kg/cm²) | | |
|---|---|---|---|---|---|---|---|---|---|
| | Polyester | | Halogen-containing resin | | | | Combustion | | Anti-track-ing (V) |
| | Copolymerized polyester resin (part) | Polybutylene terephthalate (part) | Acrylic resin (part) | Brominated bisphenol-A epoxy resin (part) | Antimony trioxide (part) | Glass fiber (part) | property (1/32") | Third shot | 15th shot |
| Example 2 | 100 | 0 | 2.0 | 0 | 5.5 | 40 | V-0 | 500 | 500 | 400 |
| Comparative Example 4 | 100 | 0 | 0 | 0 | 5.5 | 40 | V-2 | 480 | 480 | 250 |
| Comparative Example 5 | 100 | 0 | 0 | 3.9 | 5.5 | 40 | V-0 | 520 | 800 | 230 |
| Comparative Example 6 | 0 | 100 | 12.2 | 0 | 5.5 | 40 | V-0 | 560 | 560 | 300 |

Having now fully described this invention, it will be apparent to one of ordinary skill in the art that many changes and modifications can be made thereto without departing from the spirit or scope of the invention as set forth herein.

What is claimed and intended to be covered by Letters Patent is:

1. A polyester resin composition comprising:
   (a) 100 parts by weight of a copolymerized polyester resin ⓐ with a halogen content of 3 to 15% by weight prepared by copolymerizing terephthalic acid or an ester-forming derivative thereof; an alkylene glycol having 2 to 10 carbon atoms or an ester-forming derivative thereof; and a halogen-containing aromatic diol represented by the formula:

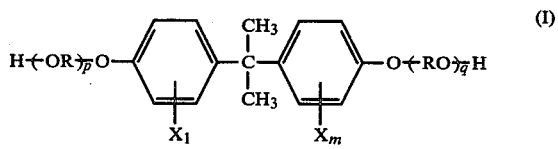

wherein R represents an alkylene of 2 to 4 carbon atoms, X represents a halogen atom, l and m each represents an integer of 1 to 4 and p and q each represents an integer of 1 to 10, and
   (b) 0.1 to 10 parts by weight of an acrylic resin ⓑ with a halogen content of not less than 10% by weight prepared by polymerizing a benzyl acrylate or benzyl methacrylate represented by the formula:

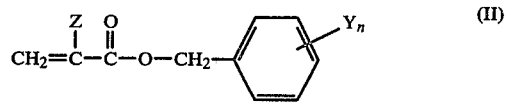

wherein Y represents a halogen atom, n represents an integer of 1 to 5 and Z represents hydrogen or methyl.

2. The polyester resin composition of claim 1 wherein the amount of the acrylic resin ⓑ is in the range of 0.5 to 5 parts by weight based on 100 parts by weight of the copolymerized polyester resin ⓐ.

3. The polyester resin composition of claim 1 wherein the total halogen content in the polyester resin composition is in the range of 3 to 15 parts by weight based on 100 parts by weight of the composition.

4. The polyester resin composition of claim 1 wherein the halogen content in the copolymerized polyester resin is in the range of 5 to 10% by weight.

5. The polyester resin composition of claim 1 wherein the halogen content in the acrylic resin is not less than 30% by weight.

6. The polyester resin composition of claim 5 wherein the halogen content in the acrylic resin is in the range of 50 to 72% by weight.

7. The polyester resin composition of claim 1 wherein the ester-forming derivative of terephthalic acid is dimethyl terephthalate.

8. The polyester resin composition of claim 1 wherein the alkylene glycol is 1,4-butanediol.

9. The polyester resin composition of claim 1 wherein R is

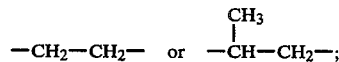

X is bromine or chlorine; p and q each is an integer of 1 to 4.

10. The polyester composition of claim 1 wherein the halogen-containing aromatic diol is 2,2-bis[4-(2-hydroxyethoxy)-3,5-dibromophenyl]propane.

* * * * *